United States Patent
Spanton et al.

(10) Patent No.: US 9,334,662 B2
(45) Date of Patent: *May 10, 2016

(54) MULTI-DIRECTIONAL REINFORCING DRYWALL TAPE

(71) Applicant: SAINT-GOBAIN ADFORS CANADA, LTD., Grand Island, NY (US)

(72) Inventors: David L. Spanton, Albion, NY (US); James Griffin, Amherst, NY (US); Kristyn Moreland, Niagara Falls, NY (US); Francis P. Dibley, Albion, NY (US)

(73) Assignee: Saint-Gobain ADFORS Canada, Ltd., Grand Island, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/307,584

(22) Filed: Jun. 18, 2014

(65) Prior Publication Data

US 2014/0290165 A1 Oct. 2, 2014

Related U.S. Application Data

(62) Division of application No. 13/486,890, filed on Jun. 1, 2012, now Pat. No. 8,795,808.

(60) Provisional application No. 61/492,045, filed on Jun. 1, 2011.

(51) Int. Cl.
*B32B 5/08* (2006.01)
*B32B 5/26* (2006.01)
*B32B 5/28* (2006.01)
(Continued)

(52) U.S. Cl.
CPC .............. *E04F 21/165* (2013.01); *C09J 7/0207* (2013.01); *C09J 7/045* (2013.01); *E04F 13/042* (2013.01); *C09J 2400/263* (2013.01); *Y10T 428/197* (2015.01); *Y10T 428/24091* (2015.01); *Y10T 428/24107* (2015.01); *Y10T 428/24116* (2015.01); *Y10T 428/24322* (2015.01); *Y10T 442/191* (2015.04); *Y10T 442/198* (2015.04)

(58) Field of Classification Search
CPC ..................................................... E04F 13/042
USPC ........ 428/105, 107, 109, 112, 61; 442/58, 50, 442/54
See application file for complete search history.

(56) References Cited

U.S. PATENT DOCUMENTS 3,966,519 A 6/1976 Mitchell et al.
3,968,283 A 7/1976 Schutte
(Continued)

FOREIGN PATENT DOCUMENTS

JP 2010-512478 A 4/2010
KR 10-2008-0005426 A 1/2008

OTHER PUBLICATIONS

International Search Report for PCT/US2010/040530 dated Feb. 1, 2013, 2 pages.

*Primary Examiner* — Alexander Thomas
(74) *Attorney, Agent, or Firm* — Robert N. Young; Abel Law Group, LLP

(57) ABSTRACT

A reinforcing drywall tape and a method of making the same, the tape having a greige combined with a laid scrim constructed in situ on the greige and bonded to the greige by a resin coating, and a pressure sensitive adhesive fully covering an inward facing surface of the greige wherein the greige is adapted for adherence to drywall sections.

20 Claims, 5 Drawing Sheets

(51) Int. Cl.
*E04F 13/04* (2006.01)
*E04F 21/165* (2006.01)
*C09J 7/04* (2006.01)
*C09J 7/02* (2006.01)

(56) References Cited

U.S. PATENT DOCUMENTS

| | | |
|---|---|---|
| 4,030,168 A | 6/1977 | Cole |
| 4,045,851 A | 9/1977 | Ashare et al. |
| 4,109,353 A | 8/1978 | Mitchell et al. |
| 4,273,825 A | 6/1981 | Nishiyama et al. |
| 4,304,751 A | 12/1981 | Li et al. |
| 4,522,004 A | 6/1985 | Evans et al. |
| 4,590,733 A | 5/1986 | Schneller et al. |
| 4,646,498 A | 3/1987 | Schneller et al. |
| 4,673,604 A | 6/1987 | Frain, III et al. |
| 4,746,565 A | 5/1988 | Bafford et al. |
| 4,748,777 A | 6/1988 | Glassco et al. |
| 4,808,675 A | 2/1989 | Twillet et al. |
| 4,812,343 A | 3/1989 | Kiekhaefer et al. |
| 4,832,995 A | 5/1989 | McLauchlin |
| 4,847,142 A | 7/1989 | Twilley et al. |
| 4,866,897 A | 9/1989 | Yount |
| 4,874,681 A | 10/1989 | Rippel |
| 4,879,850 A | 11/1989 | Glassco et al. |
| 5,017,312 A | 5/1991 | Peters et al. |
| 5,098,522 A | 3/1992 | Smurkoski et al. |
| 5,260,171 A | 11/1993 | Smurkoski et al. |
| 5,275,700 A | 1/1994 | Trokhan |
| 5,334,289 A | 8/1994 | Trokhan et al. |
| 5,364,504 A | 11/1994 | Smurkoski et al. |
| 5,370,756 A | 12/1994 | Buis et al. |
| 5,470,648 A | 11/1995 | Pearlman et al. |
| 5,514,523 A | 5/1996 | Trokhan et al. |
| 5,529,664 A | 6/1996 | Trokhan et al. |
| 5,554,467 A | 9/1996 | Trokhan et al. |
| 5,611,981 A | 3/1997 | Phillips et al. |
| 5,624,790 A | 4/1997 | Trokhan et al. |
| 5,707,710 A | 1/1998 | Zafiroglu |
| 5,723,159 A | 3/1998 | Phillips et al. |
| 5,733,490 A | 3/1998 | Phillips et al. |
| 5,855,798 A | 1/1999 | Phillips et al. |
| 5,882,770 A | 3/1999 | Makansi |
| 5,891,541 A | 4/1999 | Wynne |
| 5,972,505 A | 10/1999 | Phillips et al. |
| 5,976,627 A | 11/1999 | Wynne |
| 5,983,437 A | 11/1999 | Wakat |
| 6,054,205 A | 4/2000 | Newman et al. |
| 6,095,910 A | 8/2000 | Luedeke |
| 6,107,220 A | 8/2000 | Popper et al. |
| 6,120,710 A | 9/2000 | Makansi |
| 6,261,675 B1 | 7/2001 | Hsiao et al. |
| 6,280,546 B1 | 8/2001 | Holland et al. |
| 6,357,504 B1 | 3/2002 | Patel et al. |
| 6,373,034 B1 | 4/2002 | Rock et al. |
| 6,414,286 B2 | 7/2002 | Rock et al. |
| 6,475,596 B2 | 11/2002 | Hsiao et al. |
| 6,501,055 B2 | 12/2002 | Rock et al. |
| 6,579,586 B1 | 6/2003 | Fay et al. |
| 6,579,815 B1 | 6/2003 | Popper et al. |
| 6,609,408 B2 | 8/2003 | Chen et al. |
| 6,663,737 B2 | 12/2003 | Hsiao et al. |
| 6,723,428 B1 | 4/2004 | Foss et al. |
| 6,723,967 B2 | 4/2004 | Rock et al. |
| 6,783,345 B2 | 8/2004 | Morgan et al. |
| 6,827,118 B2 | 12/2004 | Wienands et al. |
| 6,855,392 B2 | 2/2005 | Wildeman et al. |
| 6,861,378 B2 | 3/2005 | Cunningham et al. |
| 6,946,196 B2 | 9/2005 | Foss |
| 6,960,394 B2 | 11/2005 | Graham et al. |
| 7,141,284 B2 | 11/2006 | Newton et al. |
| 7,141,768 B2 | 11/2006 | Malofsky et al. |
| 7,152,385 B2 | 12/2006 | Morgan et al. |
| 7,169,246 B2 | 1/2007 | Wienands et al. |
| 7,185,380 B2 | 3/2007 | Barnabas et al. |
| 7,213,309 B2 | 5/2007 | Wang et al. |
| 7,311,964 B2 | 12/2007 | Aldea et al. |
| 7,482,291 B2 | 1/2009 | Newton et al. |
| 7,485,186 B2 | 2/2009 | Elsaesser |
| 7,630,591 B2 | 12/2009 | Allen et al. |
| 7,700,505 B2 | 4/2010 | Leclercq et al. |
| 7,709,404 B2 | 5/2010 | Kruger et al. |
| 7,713,890 B2 | 5/2010 | Vogt et al. |
| 7,754,304 B1 | 7/2010 | Hohmann, Jr. |
| 7,757,334 B2 | 7/2010 | Patel et al. |
| 7,789,960 B2 | 9/2010 | Elsaesser |
| 7,820,565 B2 | 10/2010 | van Heerden et al. |
| 7,836,652 B2 | 11/2010 | Futterman |
| 7,846,536 B2 | 12/2010 | Dubey |
| 7,874,121 B1 | 1/2011 | Hohmann, Jr. |
| 7,914,884 B2 | 3/2011 | Royer et al. |
| 8,795,808 B2 * | 8/2014 | Spanton ............... C09J 7/045 428/109 |
| 2003/0181114 A1 | 9/2003 | Newton et al. |
| 2004/0244335 A1 | 12/2004 | Babbitt et al. |
| 2007/0099524 A1 | 5/2007 | Porter |
| 2008/0034694 A1 | 2/2008 | Banta |
| 2008/0139064 A1 | 6/2008 | Neill et al. |
| 2008/0176469 A1 | 7/2008 | Dong et al. |
| 2012/0034441 A1 | 2/2012 | Adzima et al. |

* cited by examiner

MULTI-DIRECTIONAL REINFORCING DRYWALL TAPE

CROSS-REFERENCE TO RELATED APPLICATION

The present application is a divisional of U.S. Pat. No. 8,795,808, issued Aug. 5, 2014, entitled "MULTI-DIRECTIONAL REINFORCING DRYWALL TAPE," naming inventors David L. Spanton, James Griffin, Kristyn Moreland and Francis P. Dibley, and claims priority from U.S. Provisional Patent Application No. 61/492,045, filed Jun. 1, 2011, entitled "MULTI-DIRECTIONAL REINFORCING DRYWALL TAPE," naming inventors David L. Spanton, James Griffin, Kristyn Moreland and Francis P. Dibley, which application is incorporated by reference herein in its entirety.

FIELD OF THE INVENTION

The invention relates to a reinforcing drywall tape to reinforce a joint compound, and a method of making the reinforcing drywall tape, as well as, a reinforcing drywall tape in a wallboard joint and a drywall joint having a drywall tape embedded in a drywall compound.

BACKGROUND

US 2003/0181114 discloses a drywall tape in the form of a fabric in which the reinforcing strands extend in square patterns along orthogonal axes. This gives it strength in a machine direction, the 0 degree direction along an X-axis, and in a 90 degree direction along a Y-axis orthogonal to the X-axis, or cross machine direction, but provides much less strength in angular directions between 0 degrees and 90 degrees.

US 2008/0176469 discloses a drywall tape having a fabric that includes chopped glass fibers wherein the chopped glass fibers are laid flat in the fabric to include a low profile thickness fabric, the chopped glass fibers being substantially straight, randomly laid and bonded to one another to resist forces exerted in random directions, and a reinforcement lattice including elongated reinforcing strands of low profile thickness joined against a side of the fabric, such that the lattice and the fabric reinforce each other, and reinforce the joint compound while imbedded in the joint compound.

U.S. Pat. No. 5,017,312 discloses chopped glass fiber mats tested for flexure and tensile properties according to ASTM D 790-84a "Standard Test Methods for Flexural Properties of Unreinforced and Reinforced Plastics and Electrical Insulating Materials," and ASTM D 638-84 "Standard Test Method for Tensile Properties of Plastics." The tests are performed on mats having random oriented chopped fibers and mats having directionally oriented chopped fibers. The terminology, wallboard, refers to one or more panels or panel sections having major surface areas, which form gypsum wallboard or, alternatively, portland cement wallboard or alternatively, in situ polymeric foam panels of US 2007/0099524 A1.

U.S. Pat. No. 7,141,284 B2 discloses a reinforcing web having a rewettable coating to solubilize in a slurry of a joint compound and form an adhesive bond with the joint compound.

Babbitt et al. (US 2004/0244335) discloses a method performed to determine a droop angle corresponding to stiffness of a product. Jouurnal

SUMMARY OF THE INVENTION

A reinforcing drywall tape to reinforce a joint compound includes a greige combined with a laid scrim having elongated yarns that lay in situ on the greige and are bonded to the greige and to one another by a resin coating, and a pressure sensitive adhesive fully covering an inward facing surface of the greige wherein the greige is adapted for adherence to drywall sections in reinforcing a drywall joint between the drywall sections.

A method of making a reinforcing drywall tape includes, constructing a laid scrim in situ on a first surface of a greige by laying first scrim yarns in a series thereof extending longitudinally straight at a desired oblique angle relative to an X axis of greige warp yarns, and laying second scrim yarns in a series thereof, extending longitudinally straight at a desired oblique angle relative to a Y axis of greige weft yarns, wherein the scrim yarns extend at oblique angles relative to the greige yarns; applying a resinous coating to bond the scrim and the greige; and coating an adhesive on a second surface of the greige, wherein the second surface is opposite the first surface of the greige.

A drywall joint includes a reinforcing drywall tape adhered to drywall sections; a joint compound imbedding therein the reinforcing drywall tape; and the reinforcing drywall tape including: a greige combined with a laid scrim having elongated fibers in situ on the greige and bonded to the greige and to one another by a resin coating, and a pressure sensitive adhesive fully covering an inward facing surface of the greige wherein the greige is adapted for adherence to drywall sections.

BRIEF DESCRIPTION OF THE DRAWINGS

Embodiments of the invention will now be described by way of example with reference to the accompanying drawings.

DETAILED DESCRIPTION

Open wallboard seams are formed between abutting sections of gypsum wallboard that meet side-by-side, or that meet at inside corners. To fill and cover an open wallboard seam, a wallboard joint is constructed, by applying a joint compound reinforced with an imbedded reinforcing drywall tape. Additional seams can appear as cracks in the wallboard, which are repaired by constructing wallboard joints.

The joint compound is in the form of a shapeable slurry that fills the seam. The reinforcing drywall tape is applied to extend across the filled seam, and to overlap the edge margins of the wallboard abutting the filled seam.

Figure 1:
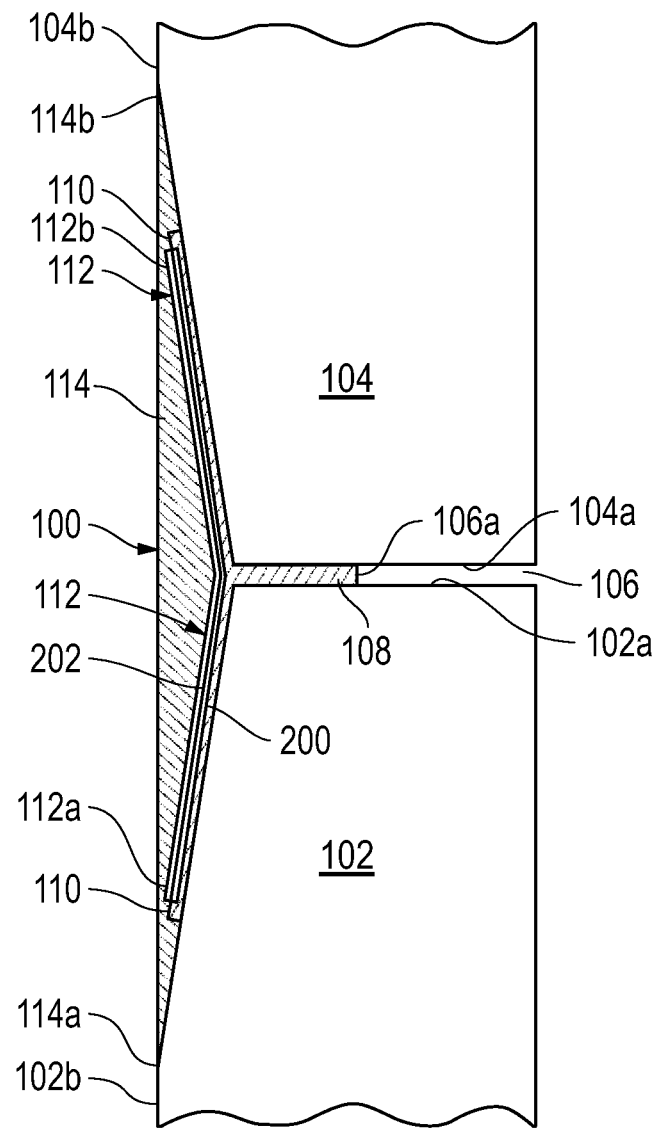
FIG. 1 is a schematic cross section view of a drywall joint at an opening between two drywall sections.

FIG. 1 discloses a drywall joint 100 and two drywall sections 102, 104. A narrow opening 106 in the form of a seam is visible between opposed edges 102a, 104a of the respective drywall sections 102, 104, whether the opposed edges 102a, 104a meet along a plane of a wall or ceiling or whether the opposed edges 102a, 104a meet at an inside corner, not shown, formed by the two drywall sections 102, 104. As shown in FIG. 1, the opposed edges 102a, 104a meet along a plane of a wall or ceiling, and for discussion purposes, are shown without a framework of studs and joists for the wall or ceiling. The opening 106 is covered by the drywall joint 100, such that the drywall appears to be seamless. According to an alternative embodiment, the two drywall sections 102, 104 are deemed to be shown in FIG. 1 as being adjacent to an opening 106 resulting from damage and in need of repair. The opening 106 is covered by the drywall joint 100, such that the drywall appears to be seamless.

The drywall joint 100 is constructed by hand or by machine. In constructing the drywall joint 100, the opening 106 is filled with a first portion 108 of a water containing joint compound, also known as a drywall compound. The wet or fluent joint compound fills the opening 106 by bridging across the opening 106, although a hollow portion 106a of the opening 106 behind the joint compound is permitted.

In FIG. 1, one form of reinforcing tape is installed, first, by applying a joint compound in a thin layer 110 on the wallboard edge margins. The thin layer 110 is used, before the joint compound dries, to affix the tape onto the wallboard. At the time of filling the opening 106, a thin first layer 110 of the joint compound is spread onto the drywall surfaces adjacent to the filled opening 106 using, for example, a 4 inch wide trowel, referred to as a drywall knife or blade, not shown, wielded by hand or by machine. The thin first layer 110 of the joint compound is contiguous with the first portion 108 and overlies the drywall surfaces 102b, 104b of the respective drywall sections 102, 104.

In FIG. 1, the drywall sections 102, 104 are disclosed with tapered surfaces 102b, 104b for purposes of illustration. Some wallboard sections are manufactured with tapered edge margins. Thereby, wallboard joints constructed on the tapered edge margins have an effectively lower profile compared to joints constructed onto the flat, major surface areas of the wallboard. However, some wallboard sections have non-tapered edge margins, wherein edge margins are part of the flat, major surface areas of the wallboard. Such wallboard sections benefit from having low profile, wallboard joints that are less prominent than the high profile, wallboard joints constructed on tapered wallboard edges. Further, alternatively, one or both of the drywall sections 102, 104 include corresponding pieces that have been cut to fit, and which have untapered surfaces 102b, 104b due to being cut to fit. According to another embodiment of the invention, when the opening 106 is caused by damage to the drywall, the untapered surfaces 102b, 104b are likely to occur adjacent to the opening 106.

With reference to FIG. 1, while the thin first layer 110 is still wet or fluent, a drywall tape 112 is applied by hand or by machine to bridge across the filled opening 106 and adhere onto the thin layer. The thin first layer 110 is at least as wide as the drywall tape 112, and preferably is slightly wider. The first layer 110 adheres the drywall tape 112 to both drywall sections 102, 104. The thin first layer 110 is air dried to solidify the same. After drying the thin first layer 110, a second layer 114 of the joint compound is applied to cover the drywall tape 112. The second layer 114 of joint compound is applied, and then spread out, smoothed and shaped with, for example, a 6-12 inch wide trowel, referred to as a drywall knife or blade, not shown, wielded by hand or by machine, to blend smoothly coplanar with the surfaces 102b, 104b of the drywall sections 102, 104, such that the drywall joint 100 hides the opening 106, and the drywall sections 102, 104 visibly appear to be seamless. Lengthwise edges 114a, 114b of the second layer 114 of the drywall joint 100 extend parallel to the lengthwise edges 112a, 112b of the drywall tape 112. The lengthwise edges 114a, 114b of the drywall joint 100 are tapered by wielding the trowel, to blend smoothly with the surfaces 102b, 104b of the drywall sections 102, 104, such that the drywall joint 100 is substantially concealed thereby. Similarly, the drywall joint 100 described herein is considered to cover an opening 106 resulting from damage to the wall or ceiling fabricated of drywall. The two drywall sections 102, 104 in FIG. 1 are considered as being the damaged drywall sections 102, 104 adjacent to the opening 106 in need of repair.

Another form of reinforcing tape is an adhesive-backed tape that has a pressure sensitive adhesive that adheres the tape to the edge margins of the wallboard. The adhesive backed tape is porous, in that it has openings through its thickness for passage of the joint compound through the tape, whereby the joint compound can pass through and fill the wallboard seam under the tape. The adhesive backed tape adheres to the drywall section 102, 104 in FIG. 1, without a need for the thin first layer 110 of the drywall compound.

The wallboard joint is further constructed by applying a thin layer of joint compound to imbed the reinforcing tape and hide the same from view. The edges of the joint compound extend beyond corresponding edges of the reinforcing tape. Further, the edges of the joint compound are tapered or feathered to blend smoothly with the wallboard surface. Thereby, the joint compound hides or camouflages the tape from visual detection as an abrupt bump on the wallboard. After the joint compound has air dried, the surface of the joint compound is lightly sanded to provide a finished wallboard seam with a relatively smooth surface that smoothly blends with the wallboard surface. At least a single layer of joint compound is applied to hide the reinforcing tape, and many times, a second layer is applied, after the first layer has dried, to touch up surface defects in the previous layer. After the joint compound has air dried, a light sanding is performed to further reduce surface roughness, which provides a surface suitable for a prime coat, paint and other surface finishes.

A low profile wallboard joint is advantageously reinforced by a low profile tape. The low profile tape must be porous for passage of joint compound to fill a wallboard seam under the tape. However, pores or openings through the tape tend to weaken the tape. To counteract a weakened tensile strength, the tape could be reinforced with reinforcing yarn. The yarn tensile strength of the yarn generally increases with yarn thickness, i.e. the cross sectional thickness. However, it would be desirable to have a yarn that is relatively thin. Then, a wallboard joint that imbeds and hides the tape could be formed with a low profile. However, reducing the yarn thickness would reduce the tensile strength of the yarn. Accordingly, a reduced yarn thickness in a low profile tape must have a tensile strength that adequately reinforces the joint compound.

Further, a reduced yarn thickness is susceptible to pull out from the joint compound. Over the passage of time, thermal cycling and wind load cycling may cause incremental pull out of the yarns from their affixed positions in the joint compound. Thus, a reduced thickness yarn must adequately resist pull out from the joint compound.

Accordingly, there is a need for a low profile reinforcing tape for reinforcing a joint compound, the tape having both a low profile and multiple openings for passage of a joint compound. Further, the tape must have a tensile strength to reinforce the joint compound. Further, the tape must resist pull out from the joint compound. Further, the reinforcing tape must lie flatly against the wallboard to assume a low profile.

Paper tape has been used as a reinforcing tape for reinforcing a wallboard joint. Moreover, commercial tooling has been developed to use paper tape for machine construction of a wallboard joint. The tooling continuously dispenses the paper tape and continuously dispenses a joint compound slurry to imbed the tape. Further, the tooling shapes and smoothes the joint compound slurry. A drawback of paper tape is that the paper is weakened by becoming saturated with water from the slurry, and is incapable of passing air bubbles that are trapped behind the paper tape during construction of a wallboard joint.

Instead of a paper tape, a fabric tape has been used to reinforce a joint compound. The fabric tape includes a mesh having reinforcing strands knitted or woven together. The reinforcing strands extend in square patterns, for example, warp and weft yarns wherein the reinforcing strands extend along orthogonal axes, X and Y axes. This gives it strength in a machine direction, the 0 degree direction along an X-axis, and in a 90 degree direction along a Y-axis orthogonal to the X-axis, or cross machine direction, but provides much less strength in angular directions between 0 degrees and 90 degrees.

Figure 2:
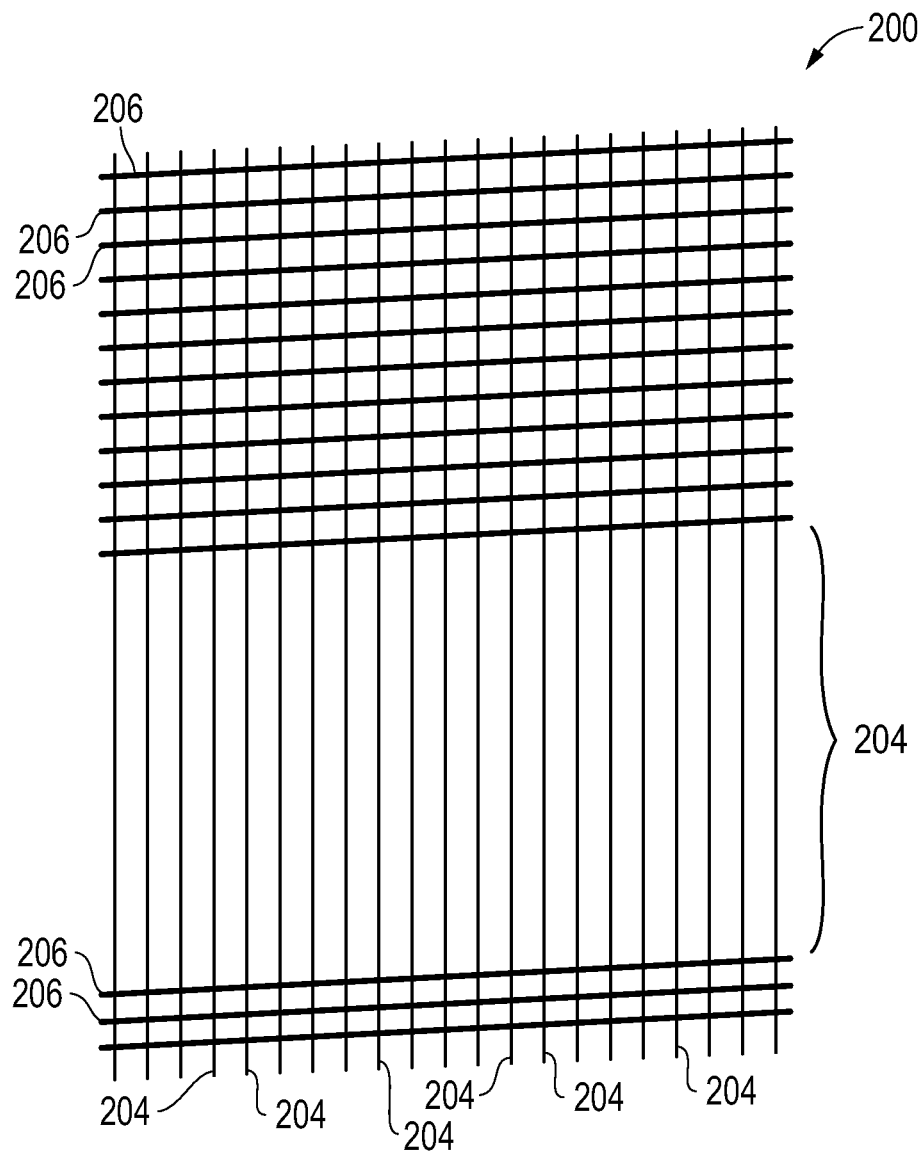
FIG. 2 is an enlarged plan view of a greige component portion of a reinforcing tape for reinforcing a drywall joint.

With reference to FIG. 2, an embodiment of the invention includes a greige 200, which is an unfinished woven or knitted fabric. The greige 200 is a component portion of a reinforcing drywall tape 112 disclosed in FIG. 4. Woven or knitted greige yarns provide tensile strength in the 0 and 90 degree directions, X and Y axes, to resist stresses or forces exerted along these directions. A preferred embodiment of the greige 200 includes a 9×9 square knit fabric having 33 tex warp yarns 204 of fiberglass at nine per inch and 68 tex weft yarns 206 of fiberglass at nine per inch, wherein the warp yarns 204 on even pitch spacing, meaning, the same nominal pitch spacing dimension, and weft yarns 206 on even pitch spacing are stitched together with a 40 denier polyester stitch yarn. The greige yarns 204, 206 encompass grid openings sufficiently large for passage of a joint compound in slurry form through the grid openings to fill a space behind the tape 112, such as the opening 106, FIG. 1, between wallboard sections 102, 104, and to imbed the tape 112 in the joint compound.

Figure 3:
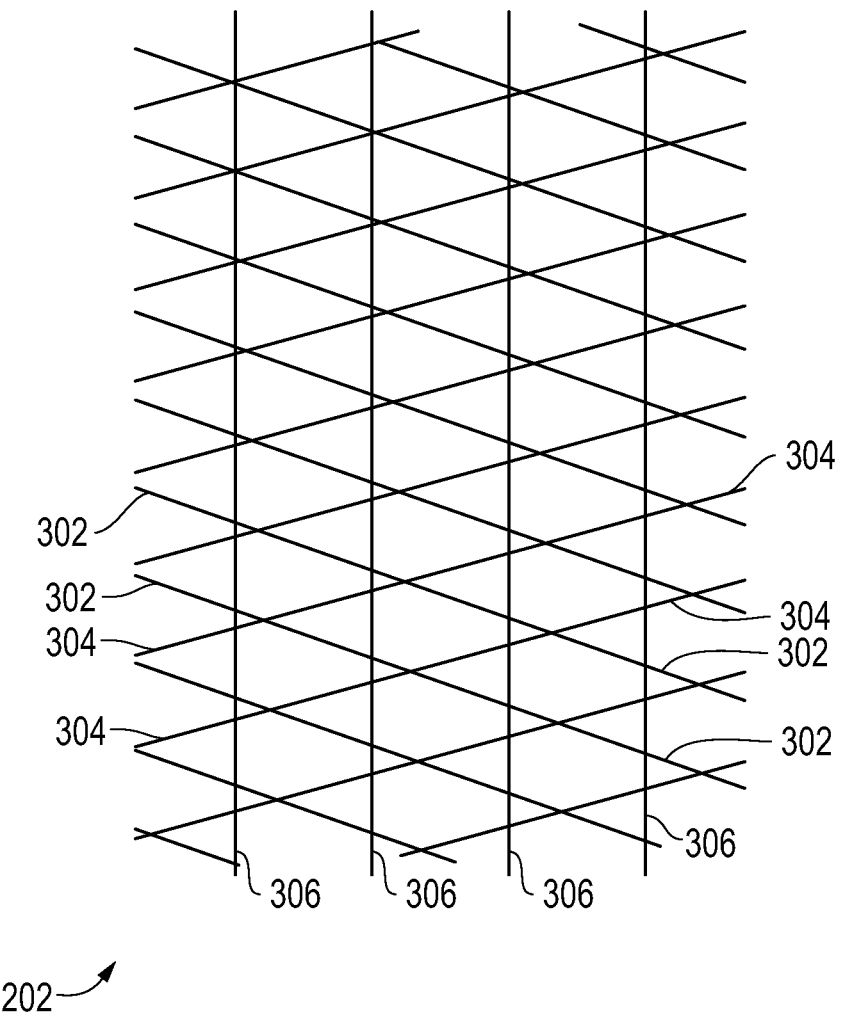
FIG. 3 is an enlarged plan view of a scrim component portion of a reinforcing tape for reinforcing a drywall joint.

FIG. 3 discloses a laid scrim 202. A preferred embodiment of the laid scrim 202 includes a 3×3×2 grid of longitudinally straight and elongated, first scrim yarns 302, 302 of 33 tex fiberglass and longitudinally straight second scrim yarns 304, 304 of 33 tex fiberglass and warp yarns 306, 306 of 68 tex fiberglass or, alternatively, 33 tex fiberglass. The laid scrim 202 has three first scrim yarns 302 per inch on even pitch spacing, and three second scrim yarns 304 per inch on even pitch spacing, and two warp yarns 306 per inch on even pitch spacing.

Figure 4:
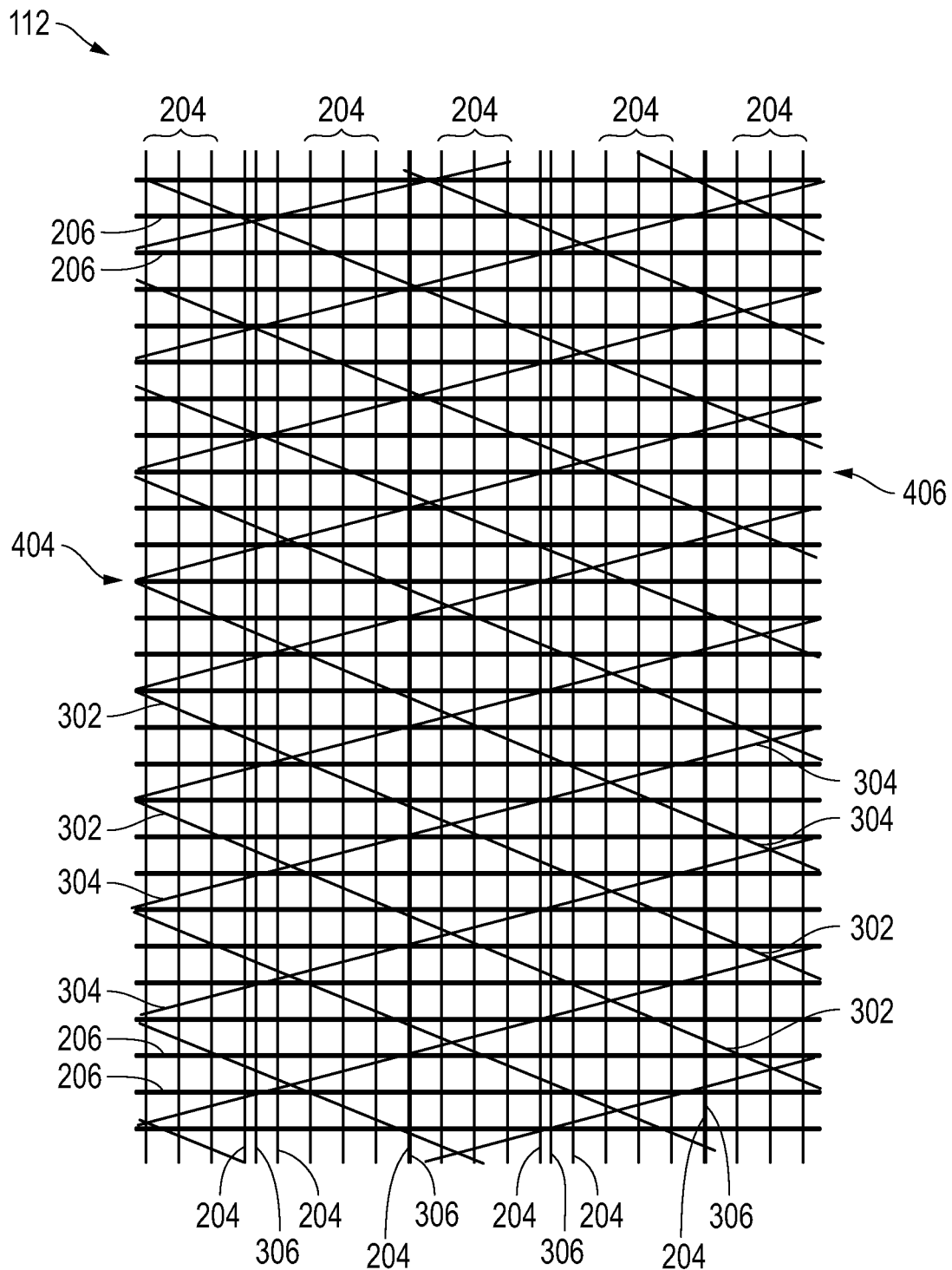
FIG. 4 is an enlarge plan view of a drywall reinforcing tape combining the greige of FIG. 2 and the scrim of FIG. 3.

In FIG. 4, the greige 200 provides a carrier on which the laid scrim 202 is made and assembled onto the greige 200 to make a final product including the reinforcing drywall tape 112. The greige 200 is placed in tension while the elongated fibers of the laid scrim 202 are laid onto an outer surface of the greige 200. A method of constructing the scrim 202 in situ on the greige 200 includes applying each elongated scrim yarn 302, 302, 304, 304 against an outer surface of the greige 200, wherein the greige 200 provides a carrier during construction of the laid scrim 202. The greige 200 is conveyed under tension while the laid scrim 202 is constructed by laying the first scrim yarns 302, 302 placed against an outer surface of the greige 200 at respective acute angles to the greige yarns. Similarly, the second scrim yarns 304, 304 are laid against an outer surface of the greige 200 at respective acute angles to the greige yarns. Then the warp yarns 306, 306 are laid against the scrim yarns 302, 302, 304, 304, respectively.

With reference to FIG. 4, beginning at the first lateral edge 404, the tape 112 having both the greige 200 and the scrim 202 has a series pattern of a group of three greige warp yarns 204, 204, 204 on even pitch spacing, followed by a group including two greige warp yarns 204, 204 and a scrim warp yarn 306 therebetween on lesser pitch spacing, followed by another group of three greige warp yarns 204, 204, 204 on even pitch spacing, followed by a group of one greige warp yarn 204 substantially superposed with and by one scrim warp yarn 306. The series pattern is fully repeated once laterally across the tape 112, and is partially repeated once laterally across the tape to provide yet another group of three greige warp yarns 204, 204, 204 on even pitch spacing adjacent the second lateral edge 406 of the tape 112.

With reference to FIG. 4, the first scrim yarns 302, 302 and the second scrim yarns 304, 304 cross one another and form a grid of the scrim yarns. The grid can be a rhombic parallelogram or a trapezoidal parallelogram depending upon the pitch spacings of the scrim yarns, wherein the first scrim yarns 302, 302 and second scrim yarns 304, 304 are laid longitudinally straight and cross one another at complementary oblique and obtuse angles. Adjacent first scrim yarns 302, 302 are spaced apart in the grid, and adjacent second scrim yarns 304, 304 are spaced apart in the grid, to encompass grid openings sufficiently large for passage of a joint compound in slurry form through the grid openings to fill a space behind the tape 112, such as the opening 106, FIG. 1, between wallboard sections 102, 104, and to imbed the tape 112 in the joint compound. The angled yarns 302, 302, 304, 304 of the scrim 202 are 33 tex fiberglass at 2 pics per inch. The angled yarns provide increased tensile strength along the complementary oblique and obtuse angles. This is important for resisting stresses applied at such angles.

With reference to FIG. 4, in the final product including the reinforcing drywall tape 112, the laid scrim 202 is a readily apparent structural feature, wherein the nonwoven scrim yarns 302, 302, 304, 304 and the nonwoven scrim warp yarns 306, 306 lay against the greige 200 without interlacing with the greige yarns and without interlacing with one another. A thin resinous coating (not shown) bonds the scrim yarns to an outer surface of the greige 200.

The thin resinous coating, an embodiment of which is a 20% solution of styrene butadiene rubber (SBR), bonds the scrim yarns to the outer surface of the greige 200. Further, the scrim yarns 302, 302, 304, 304 and the scrim warp yarns 306, 306 are applied against the greige 200 without interlacing with the greige yarns and without interlacing with one another.

According to a first preferred embodiment, while the scrim 202 and greige 200 are maintained in tension, the thin resinous coating is applied by dip coating the combined scrim 202 and greige 200, or by spraying the thin resinous coating, at least to cover completely the scrim yarns and an outer surface of the greige 200 against which the scrim yarns are bonded by the thin resinous coating. The thin resinous coating completely covers at least the outer surface of the greige or fabric 200 against which the scrim yarns are laid or otherwise applied. Alternatively, by dip coating the combined scrim 202 and greige 200 in the composition of the thin resinous coating, the thin resinous coating completely covers all surfaces of the combined scrim 202 and greige 200. Yarns of the greige 200 and yarns of the scrim 202 are made softer to the touch by the resinous coating, which reduces abrasiveness or irritation to the human skin.

While the scrim 202 and greige 200 are maintained in tension, the thin resinous coating is cured by hot air drying. The cured resinous coating 400 bonds together the scrim 202 and the greige 200, and stiffens the respective yarns of both the scrim 202 and greige 200.

The combined scrim 202 and greige 200 are transferred to a coater apparatus, not shown. An inner surface of the greige 200, which is opposite the outer surface of the greige 200, is coated completely by a thin resinous coating of a pressure sensitive adhesive (not shown). The adhesive adapts an inner surface of the greige 200 for adherence to the drywall sections 102, 104, FIG. 1.

Figure 5:
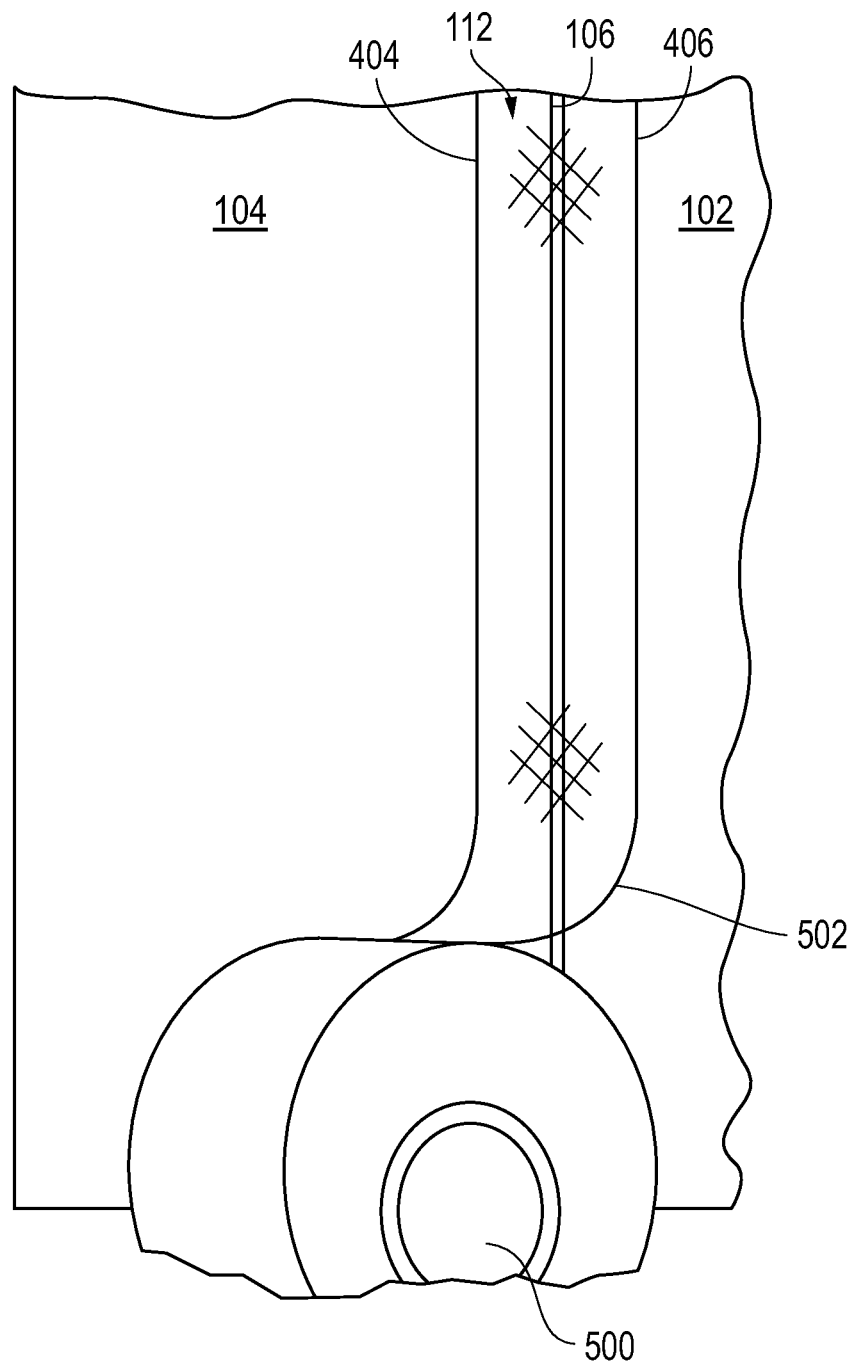
FIG. 5 is a schematic view of a drywall reinforcing tape dispensed from a roll and adhered to drywall sections.

With reference to FIG. 5, the final product, a tape width of about 2⅜ inches is obtained by severing the tape 112 to the desired tape width. About 250 linear feet of the tape 112 can be rolled up onto a cardboard tube 500. The adhesive adapts the greige warp yarns and the greige weft yarns including the inner surface of the greige 200 to adhere to drywall sections 102, 104, after which drywall compound in slurry form is applied in slurry form for passage through openings in the drywall reinforcing tape 112 in order to fill the drywall opening 106 and to construct a drywall joint similar to that disclosed by FIG. 1.

With reference to FIGS. 2 and 4, the greige yarns include relatively thinner and longer warp yarns 204, 204, et seq. in series lengthwise of the reinforcing tape 112, and relatively thicker and shorter weft yarns 206, 206, et seq. in series laterally between lateral edges 404, 406 of the reinforcing tape 112, wherein the relatively thicker and shorter weft yarns 206, 206 are stiffened in straight orientations by having the resin coating thereon and by having a coating of the adhesive thereon, wherein the weft yarns 206, 206 stiffen the reinforcing drywall tape 112 in a substantially or essentially straight orientation between the lateral edges 404, 406 of the reinforcing drywall tape 112.

With reference to FIG. 5, the tape 112 is stiffened in a flat orientation between the lateral edges 404, 406 for application to the drywall sections 102, 104 without wrinkles or droop between the lateral edges 404, 406.

With reference to FIGS. 2 and 4, the greige warp yarns 204, 204 are longer and thinner than the greige weft yarns 206, 206, and are stiffened by having the resin coating thereon and by having a coating of the adhesive thereon, while being relatively thinner than the weft yarns 206, 206 to droop 502, FIG. 5, at a droop angle lengthwise of the tape 112 in order for the tape 112 to bend slightly and transfer from the roll and flatly against the drywall sections 102, 104. The droop 502 is determined according to Babbitt et al. (US 2004/0244335) that discloses a method performed to determine a droop angle corresponding to stiffness of a product.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Patents and patent applications referred to herein are hereby incorporated by reference in their entireties. Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A reinforcing fabric, comprising:
    a greige combined with a laid scrim, wherein the laid scrim comprises nonwoven yarns laid on the greige and bonded to the greige and to one another by a resin coating; and
    a pressure sensitive adhesive covering a surface of the greige;
    wherein the greige is adapted for adherence to drywall.

2. The reinforcing fabric of claim 1, wherein the greige yarns comprise warp yarns and weft yarns, wherein the weft yarns are stiffened in straight orientations by having the resin coating thereon and by having the adhesive coating thereon, and wherein the weft yarns stiffen the reinforcing fabric in a straight orientation between lateral edges of the reinforcing fabric.

3. The reinforcing fabric of claim 2, wherein the greige warp yarns are longer than the greige weft yarns, are stiffened by having the resin coating thereon and by having the adhesive thereon, and are relatively thinner than the weft yarns to droop at a droop angle lengthwise of the fabric.

4. The reinforcing fabric of claim 1, wherein the greige provides a carrier for the laid scrim.

5. The reinforcing fabric of claim 1, wherein, beginning at a first lateral edge of the fabric, the fabric comprises a pattern of: a group of three greige warp yarns on even pitch spacing, a group of two warp yarns and a scrim warp yarn therebetween on lesser pitch spacing, another group of three greige warp yarns on even pitch spacing, and a group of one greige warp yarn substantially superposed with one scrim warp yarn;
    wherein the pattern is fully repeated once across the fabric; and
    wherein the pattern is partially repeated once across the fabric to provide a third group of three greige warp yarns on even pitch spacing adjacent to a second lateral edge of the fabric.

6. The reinforcing fabric of claim 1, wherein the greige comprises yarns and wherein individual scrim yarns are obliquely-angled relative to the greige yarns, and the individual scrim yarns cross one another and form a grid against an outer surface of the greige.

7. The reinforcing fabric of claim 6, wherein the grid comprises a rhombic parallelogram or a trapezoidal parallelogram.

8. The reinforcing fabric of claim 1, wherein the resin coating covers an outer surface of the greige.

9. The reinforcing fabric of claim 8, wherein the resin coating covers the scrim yarns against the outer surface of the greige and bonds the scrim yarns and the outer surface of the greige.

10. The reinforcing fabric of claim 1, wherein the fabric comprises openings for passage of a drywall compound.

11. The reinforcing fabric of claim 1, wherein the reinforcing fabric is adapted to repair damage in a drywall section.

12. The reinforcing fabric of claim 11, wherein the reinforcing fabric is adapted to repair an opening in the drywall section.

13. The reinforcing fabric of claim 1, wherein the reinforcing fabric comprises a drywall tape to reinforce a joint compound.

14. The reinforcing fabric of claim 1, wherein the pressure sensitive adhesive fully covers an inward facing surface of the greige.

15. A drywall joint, comprising:
- the reinforcing fabric of claim 1 applied to at least one drywall section, wherein the reinforcing fabric is embedded in a joint compound.

16. The drywall joint of claim 15, wherein the joint compound comprises a slurry.

17. The drywall joint of claim 16, wherein the joint compound is adapted to pass through openings in the reinforcing fabric.

18. The drywall joint of claim 15, wherein the at least one drywall section is damaged.

19. The drywall joint of claim 18, wherein the damage comprises an opening.

20. The drywall joint of claim 15, wherein the reinforcing fabric is applied to the at least one drywall section without wrinkles or droop between lateral edges of the reinforcing fabric.

\* \* \* \* \*